UNITED STATES PATENT OFFICE.

CHARLES S. REEVE, OF GRANTWOOD, NEW JERSEY, ASSIGNOR TO THE BARRETT COMPANY, A CORPORATION OF NEW JERSEY.

BITUMINOUS EMULSION.

1,398,201.  Specification of Letters Patent.  Patented Nov. 22, 1921.

No Drawing.   Application filed February 10, 1921.  Serial No. 443,863.

*To all whom it may concern:*

Be it known that I, CHARLES S. REEVE, a citizen of the United States, residing at Grantwood, in the county of Bergen and State of New Jersey, have invented certain new and useful Improvements in Bituminous Emulsions, of which the following is a specification.

This invention relates to the production of emulsions from bituminous materials and to the product thereby produced. It relates more especially to bituminous materials of a liquid, semi-solid, or solid nature which may be emulsified or finely dispersed in water by means of argillaceous material such as clay or similar emulsifying material.

One of the objects of the invention is to produce an aqueous emulsion of bituminous material with a relatively smaller percentage of clay than has heretofore been described in the literature. Another object of the invention is to improve the process whereby emulsions can be produced.

It has been known for a long time that emulsions could be produced by stirring, grinding or kneading clay, or other argilliferous material, water and bituminous materials. In these prior processes a relatively thick or pasty clay-water mixture was used with which the bituminous material was stirred or ground to form an emulsion. By these old methods, however, it has been found practically impossible to perfect an emulsion in which the final proportion of bitumen, either coal tar pitch or asphalt, to clay exceeds 3 to 1. Nothing published in the prior art seems to indicate that water dispersible emulsions richer than this in bitumen as related to clay have heretofore been described in a patent or printed publication. In the former processes the addition of a greater proportion of bitumen causes it to become the outer phase of the system and the products become non-dispersible in water. For many purposes the clay present is an inert, useless, and in some cases objectionable material, after having served its purpose as an emulsifier for the bitumen. It is, in other words, frequently desirable to use the bituminous material in the emulsified form with as little extraneous or inert matter as possible.

The present invention overcomes this objection by enabling one to produce excellent emulsions in which the bituminous material may be ten or more times the clay present. I accomplish this result by starting with the components, that is, the clay-water mixture and the bitumen, in the form of relatively thin liquids as compared to former practice, by rapidly beating or "whipping" them together, and by continually cooling the bitumen as it is introduced into the clay-water mixture to prevent coalescence of the same.

In order to make the invention more clearly understood, the following specific examples are given for illustrative purposes, but it is not intended to restrict the invention to the exact proportions, temperatures or materials mentioned. Using a soft coal tar pitch having a melting point of 100°–110° F. (as determined by the cube in water method) I proceed by making a thin cream consisting of about seven or eight parts of water to one part of clay by weight. This is contained in a mixer so designed as to be capable of rapidly beating or "whipping" the mass, and also surrounded by a jacket connected with both a steam and cold water supply for heating or cooling the mass. In using the above mentioned pitch, the cream or mixture of clay and water, is held at ordinary room temperature (say about 70° F.) and rapidly "whipped" or stirred during the slow addition of about 10 parts of the pitch brought to an approximate temperature of 240°–260° F. During the addition of the pitch and until the emulsion is perfected, the mass in the mixer is kept cold enough to prevent coalescence of the bitumen by circulation of water through the jacket. Should the emulsion become too thick before the whipping operation is completed, it may be rendered of the proper consistency by the addition of a small amount of water.

Similarly, and by way of further example illustrating my invention, I may take an asphalt having a melting point of approximately 160° F. (as determined by the well known ring-and-ball method) and by heating it in any convenient way to a temperature of about 360°–380° F. I can emulsify it in the proportion of about fifteen or more parts of asphalt to one of clay and by substantially the same method described above except that I use a higher initial temperature of the clay cream which in this case should preferably be about 120° F.

In either case, the desirable procedure is to introduce the bitumen in a thin fluid state so that it is capable of immediate dispersion into fine particles throughout the clay cream with continuous cooling to prevent coalescence of the particles of bitumen. The temperature to which the bitumen must be cooled will vary with the character and melting point of the bitumen, but such a differential must be maintained between the temperature of the clay cream and that of the bitumen as will prevent coalescence of the latter and still permit of its dispersion.

I claim:

1. The process of producing an emulsion which comprises adding a bitumen in a fluid state to a mixture of clay and water while agitating said mixture and maintaining its temperature at such a point that the bitumen will be dispersed without a substantial amount of coalescence of the same.

2. The process of producing an emulsion which comprises adding a bitumen in a fluid state to a mixture of clay and water while agitating said mixture and maintaining its temperature at such a point that the bitumen will not coalesce but will disperse.

3. The process of producing an emulsion which comprises adding a hot bitumen in a fluid state to a mixture of clay and water while agitating said mixture and maintaining its temperature at such a point that the bitumen will be dispersed without a substantial amount of coalescence of the same.

4. The process of producing an emulsion which comprises adding asphalt in a fluid state to a mixture of clay and water while agitating said mixture and maintaining its temperature at such a point that the asphalt will be dispersed without a substantial amount of coalescence of the same.

5. The process of producing an emulsion which comprises adding hot asphalt in a fluid state to a mixture of clay and water while agitating said mixture and maintaining its temperature at such a point that the asphalt will be dispersed without a substantial amount of coalescence of the same.

In testimony whereof I affix my signature.

CHARLES S. REEVE.